United States Patent [19]

Nanba et al.

[11] Patent Number: 4,785,092

[45] Date of Patent: Nov. 15, 1988

[54] ALUMINUM BRAZING MATERIAL FOR USE IN ALUMINUM HEAT EXCHANGER

[75] Inventors: Keizo Nanba; Michiki Hagiwara, both of Nagoya; Shosuke Iwasaki, Kobe; Tetsuo Abiko, Osaka, all of Japan

[73] Assignees: Sumitomo Light Metal Industrial, Ltd., Tokyo; Sumitomo Precision Products Co., Ltd., Amagasaki, both of Japan

[21] Appl. No.: 713,072

[22] Filed: Mar. 15, 1985

[30] Foreign Application Priority Data

May 25, 1984 [JP] Japan .............................. 59-104456

[51] Int. Cl.$^4$ .............................................. C22C 21/10
[52] U.S. Cl. ................................. 420/540; 228/263.17; 420/531; 420/532; 420/534; 420/537; 420/541; 420/546; 420/549; 428/654
[58] Field of Search ............... 420/549, 546, 537, 534, 420/531, 532, 540, 541; 148/437; 428/654; 228/263.17

[56] References Cited

U.S. PATENT DOCUMENTS

| 3,811,177 | 5/1974 | Schoer et al. | 420/549 |
| 4,068,645 | 1/1978 | Jenkinson | 148/437 |
| 4,464,442 | 8/1984 | McDonald et al. | 428/654 |

Primary Examiner—R. Dean
Attorney, Agent, or Firm—Flynn, Thiel, Boutell & Tanis

[57] ABSTRACT

Aluminum brazing alloys for assembling aluminum heat exchangers by brazing which consist essentially of 4.5 to 13.5% of Si, from 0.005% to less than 0.1% of Sr and the balance essentially Al and, further, optionally may contain at least one element selected from the group consisting of 0.3 to 3.0% of Mg, 2.3 to 4.7% of Cu and 9.3 to 10.7% of Zn. The aluminum brazing alloys provide high strength brazed joints with highly refined microstructure and brazing operation can be performed in a good condition without causing any detrimental cavity. Such excellent properties make the brazing alloys especially suited for the fabrication of superhigh pressure heat exchangers.

4 Claims, 3 Drawing Sheets

FIG. I

ALUMINUM BRAZING MATERIAL FOR USE IN ALUMINUM HEAT EXCHANGER

BACKGROUND OF THE INVENTION

The present invention relates to aluminum brazing alloys used for brazing aluminum structural members or articles and more particularly to alloys suitable for fabricating plate fin heat exchangers adapted for superhigh pressure service by brazing.

Conventionally, plate fin heat exchangers made of aluminum have been fabricated by means of an appropriate brazing technique such as dip brazing, vacuum brazing or atmospheric brazing wherein aluminum brazing alloys containing 4.5 to 13.5% Si and optionally, the addition of less than 3% Mg or 2.3 to 4.7% Cu and 9.3 to 10.7% Zn have been commonly employed. The above-mentioned silicon containing brazing alloys with or without the optional elements may further contain Be and Bi with a view to improving wettability. Throughout the present specification, percentages are by weight unless otherwise indicated. Besides the foregoing brazing alloys, aluminum alloys containing 4.5 to 13.5% of Si, less than 3% of Mg and 0.1 to 1.5% of Sr is proposed as aluminum brazing alloys capable of achieving high strength brazed joints in the fabrication of large-sized heat exchangers in Japanese patent application laid-open No. 56-169 744.

Superhigh pressure service plate fin heat exchangers are specified by the rupture pressure when rupture of the heat exchanges is caused due to the internal pressure. Strength at brazed joint portions is regarded as a dominant factor of the rupture pressure and the strength mainly depends on the width of the fillet and the structure in the brazed joint portions. In the fabrication of large scale heat exchangers, since the width of the fillet is greatly restricted by a prolonged preheating time for brazing and other brazing conditions, a satisfactory improvement in brazing can not be attained and the rupture pressure remains at a low level.

On the other hand, in general, the metallugical structure of the brazed portion can be refined by increasing the cooling rate after brazing, whereby the strength can be increased. However, practically, it is very difficult to increase the cooling rate in the construction of a large-sized heat exchanger.

For the foregoing reasons, applicable pressure in heat exchangers practically used is at most in the order of 50 kg/cm$^2$.

Further, the aluminum brazing alloy with Sr, addition as set forth above, is inferior in wettability, whereby causing cavities to develop in brazed portions.

SUMMARY OF THE INVENTION

It is therefore an object of the present invention to provide improved aluminum brazing alloys free of the foregoing disadvantages encountered in the prior art and more particularly to provide aluminum brazing alloys highly useful in assembling aluminum plate fin heat exchangers intended for use under superhigh pressures by brazing process.

According to the present invention, there are provided a first aluminum brazing alloy consisting essentially of 4.5 to 13.5% of Si, from 0.005% to less than 0.1% of Sr, and the balance essentially aluminum and further a second aluminum brazing alloy containing, in addition to the first alloy composition, at least one element selected from the group consisting of 0.3 to 3.0% of Mg, 2.3 to 4.7% of Cu and 9.3 to 10.7% of Zn. The aluminum brazing alloys of the present invention develop a very refined metallurgical structure in the brazed joints by utilizing ordinary brazing techniques, whereby significantly improving the strength of the brazed joints and brazability.

BRIEF DESCRIPTION OF THE DRAWINGS

FIGS. 1 and 2 are micrographs showing microstructures of the brazed portions at cross-shaped joints brazed in the manner described in Example 1, wherein FIG. 1 is for test specimen No. 2 according to the present invention and FIG. 2 for a comparative test specimen No. 1;

DETAILED DESCRIPTION OF THE PREFERRED EMBODIMENTS

In accordance with the present invention, it was found that the foregoing problems and disadvantages encountered in the conventional brazing alloys may be solved by using the aluminum alloy brazing compositions specified below:

(1) An aluminum brazing alloy consisting essentially of 4.5 to 13.5% of Si, from 0.005% to less than 0.1% of Sr and the balance essentially Al.

(2) An aluminum brazing alloy consisting essentially of 4.5 to 13.5% of Si, from 0.005% to less than 0.1% of Sr and at least one element selected from the group consisting 0.3 to 3.0% of Mg, 2.3 to 4.7% of Cu and 9.3 to 10.7% of Zn and the balance essentially Al.

Now, the function of each alloying component and the reason why each component is limited to the content specified above will be described below.

Si: This component is a main alloying component and advantageously reduces the melting point of brazing alloys, whereby providing a desirable flowability. A Si content of under 4.5% unfavorably reduces the flowability and presents difficulties in brazing operation. On the other hand, when the Si content is more than 13.5%, the melting point of the resulting brazing alloy is increased to an unacceptable level and the resultant alloys do not possess good properties for use as brazing materials.

Mg: Mg makes it possible to braze in a vacuum or non-oxidizing atmosphere without requiring the use of flux. With a Mg content of less than 0.3%, the effect can not be sufficiently attained, while an excess Mg content of over 3.0% causes an excessive volatilization of Mg and, thus, the furnace used will be considerably polluted due to the adherence of volatilized Mg.

Cu: Cu reduces the melting point of brazing alloys and improves their brazability. When Cu is present in an amount of less than 2.3%, the functions are insufficient, while a Cu content exceeding 4.7% will adversely affect brazability.

Zn: Zn has an effect of reducing melting point and facilitates brazing process. A Zn content of less than 9.3% can not provide the effect at a sufficient level. On the other hand, an excess Zn content of more than 10.7% will detrimentally lower brazability.

Sr: This component has a brazability improving effect. When Sr is present in an amount of less than 0.005%, the effect is insufficient, whereas a Sr content of 0.1% or more can not give a satisfactory wettability to the resulting brazing alloys, whereby lowering brazability.

The present invention will now be described in detail hereinbelow with reference to the examples.

EXAMPLE 1

Figure 3:
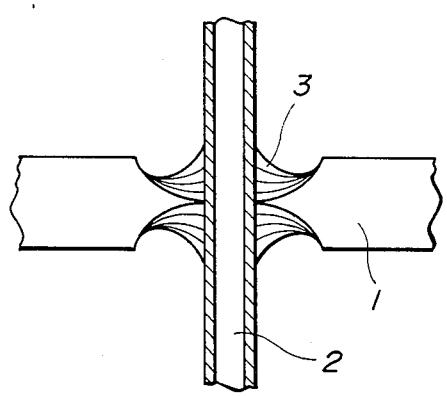
FIG. 3 is a illustrative vertical cross-sectional view of the above cross-shaped brazed joint.

As shown in FIG. 3, a brazing sheet 2 was disposed between 3.3 mm thick AA3003 sheets 1 having a K-shaped groove, a root face width of 0 and a groove angle of 45° to form a cross-shaped joint and brazed in a vacuum of $2 \times 10^{-5}$ mmHg by heating at 600° C. for three minutes and at 600° C. for one hour, respectively. The brazing sheet 2 used here had a total thickness of 1.6 mm and was composed of a core of AA3003 alloy and claddings which were made of Al-10% Si-1.5% Mg brazing alloy with or without 0.03% Sr and bonded to both surfaces of the core at a cladding ratio of 10%. Reference numeral 3 represents the filler layer of the above-mentioned Al-10% Si-1.5% Mg brazing alloy with or without 0.03% Sr. Each cross-shaped brazed joint formed in the above manner was examined on microstructure and strength at the brazed joint portion and the results are given in Table 1.

TABLE 1

Results of burst test at brazed joints
(Rupture strength values indicated below are the mean values of five measurements.)

| Test specimen | 600° C. × 3 min. | | 600° C. × 1 hr. | |
|---|---|---|---|---|
| | Ruptured portion | Rupture strength at brazed portion (kg/mm$^2$) | Ruptured portion | Rupture strength at brazed portion (kg/mm$^2$) |
| No. 1 | Brazed portion | 8.6–9.5 | Brazed portion | 6.6–8.2 |
| Sr-free No. 2 (containing 0.03% Sr) | Base metal | not less than 10.5 | Base metal | not less than 8.9 |

Figure 1:
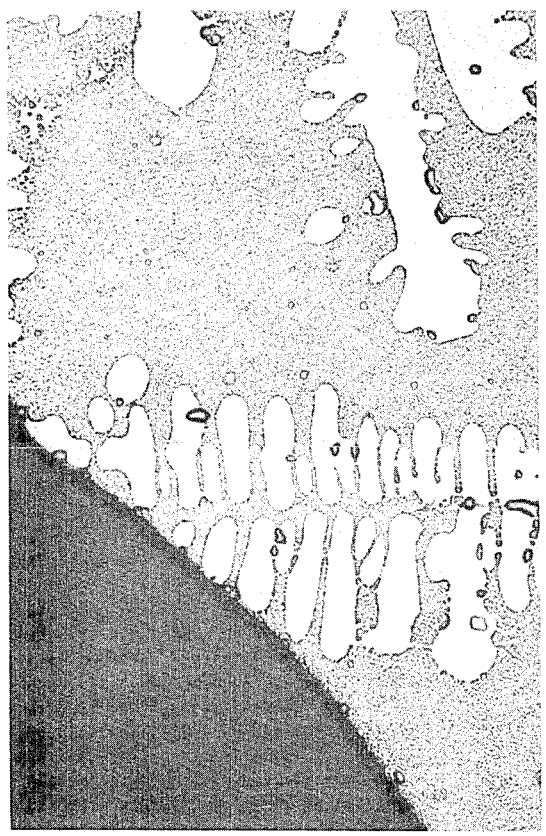
Figure 2:

FIGS. 1 and 2 are micrographs (×100) showing the microscopic structures at brazed joint portions of the brazing alloy test specimen No. 2 and the brazing alloy test specimen No. 1, respectively. FIG. 1 reveals a refined eutectic structure, whereas FIG. 2 shows a coarse eutectic structure.

EXAMPLE 2

Figure 4:
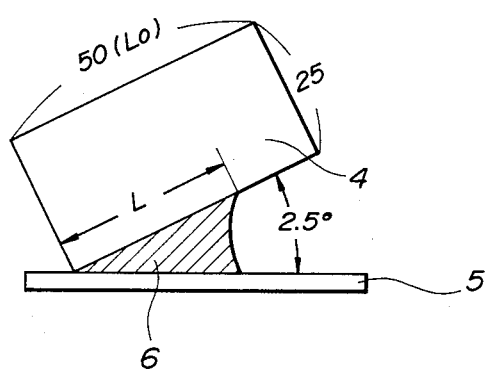
FIG. 4 is a illustrative view of a test specimen for clearance-filling test.

A brazing sheet composed of a core of AA3003 alloy and claddings which are made of each alloy given in Table 2 below and bonded to both surfaces of the core at a cladding ratio of 10% was combined with an AA3003-O alloy sheet to prepare a test piece as in the arrangement shown in FIG. 4 and clearance-filling test was carried out on each test piece in order to examine brazability. In FIG. 4, reference numerals 4, 5 and 6 represent a brazing sheet, 50 mm×25 mm in size and 1 mm in thickness, an AA3003-O aluminum sheet, 60 mm square in size and 1 mm in thickness, and a filler layer of each brazing alloy shown in Table 2, respectively. The test results are presented in Table 2.

TABLE 2

| Brazing sheet No. | Brazing alloy composition in brazing sheet | | Filling rate L/Lo × 100(%) | Appearance of brazed portion | Brazing conditions |
|---|---|---|---|---|---|
| | Main composition | Addition amount of Sr | | | |
| *1 | Al—10% Si—1.5% Mg (corres. to AA4004) | 0 | 75 | Good | Vacuum brazing (fluxless) in a vacuum of $2 \times 10^{-5}$ mmHg at 600° C. for 3 mins. |
| 2 | Al—10% Si—1.5% Mg (corres. to AA4004) | 0.03% | 76 | Good | |
| 3 | Al—10% Si—1.5% Mg (corres. to AA4004) | 0.07% | 73 | Good | |
| *4 | Al—10% Si—1.5% Mg (corres. to AA4004) | 0.12% | 48 | Occurrence of cavities | |
| *5 | Al—10% Si—1.5% Mg (corres. to AA4004) | 1% | 10 | Occurrence of cavities | |
| *6 | Al—10% Si (corres. to JIS BA4045) | 0 | 78 | Good | Furnace brazing (using flux) in air at 600° C. for 3 mins. |
| 7 | Al—10% Si (corres. to JIS BA4045) | 0.03% | 77 | Good | |
| 8 | Al—10% Si (corres. to JIS BA4045) | 0.07% | 75 | Good | |
| *9 | Al—10% Si (corres. to | 0.12% | 53 | Occurrence of | |

TABLE 2-continued

| Brazing sheet No. | Main composition | Addition amount of Sr | Filling rate L/Lo × 100(%) | Appearance of brazed portion | Brazing conditions |
|---|---|---|---|---|---|
| | JIS BA4045) | | | cavities | |
| *10 | Al—10% Si (corres. to JIS BA4045) | 1% | 20 | Occurrence of cavities | |
| *11 | Al—10% Si—4% Cu (corres. to JIS BA4145) | 0 | 77 | Good | Furnace brazing (using flux) in air at 580° C. for 3 mins. |
| 12 | Al—10% Si—Cu (corres. to JIS BA4145) | 0.03% | 78 | Good | |
| 13 | Al—10% Si—Cu (corres. to JIS BA4145) | 0.07% | 76 | Good | |
| *14 | Al—10% Si—4% Cu (corres. to JIS BA4145) | 0.12% | 51 | Occurrence of cavities | |
| *15 | Al—10% Si—4% Cu (corres. to JIS BA4145) | 1% | 25 | Occurrence of cavities | |
| *16 | Al—10% Si—4% Cu—10% Zn | 0 | 77 | Good | Furnace brazing (using flux) in air at 560° C. for 3 mins. |
| 17 | Al—10% Si—4% Cu—10% Zn | 0.03% | 76 | Good | |
| 18 | Al—10% Si—4% Cu—10% Zn | 0.07% | 74 | Good | |
| *19 | Al—10% Si—4% Cu—10% Zn | 0.12% | 50 | Occurrence of cavities | |

*Comparative brazing sheets

Further, brazing sheets No. 6 and No. 7 given in the above Table 2 were each combined with an AA3003 aluminum sheet to form a cross-shaped brazed joint as in the testing manner set forth in Example 1 and then brazed in air by heating at 600° 1 C. for 3 minutes. Thereafter, the brazed test specimens were tested on burst test and the test results are given in Table 3.

TABLE 3

Results of burst test at brazed joints
(Rupture strength values indicated below are the mean values of five measurements.)

| Test specimen | Ruptured portion | Rupture strength at brazed portion (kg/mm$^2$) |
|---|---|---|
| No. 1 (Sr-free) | Brazed portion | 8.3–9.0 |
| No. 2 (containing Sr) | Base metal | not less than 10.5 |

As evidently shown in FIG. 1, the aluminum brazing alloys of the present invention develop a much highly refined structure at brazed joint portions by any commonly practiced brazing process, for example, vacuum brazing, brazing in an atmosphere of nitrogen gas, etc., or dip brazing, thereby, as manifested in the experimental results given in Tables 1 to 3 of the examples above, provide high strength brazed joint as compared to conventional aluminum brazing alloys including Al-Si, Al-Si-Mg and Al-Si-Cu(or Zn) brazing alloy and eliminate the breakage or rupture problems due to internal pressure or other destructive force. Further, occurrence of cavities unavoidably encountered in Al-Si-Sr brazing alloy disclosed in Japanese patent application laid-open No. 56-169 744 was not detected at the brazed joint of the present invention and brazing can be performed in a good condition. Such superior properties render the aluminum brazing alloys of the present invention highly suited for assembling plate fin heat exchanghers for superhigh pressure service of over 50 kg/cm$^2$ G by brazing.

What is claimed is:

1. An aluminum brazing material used for assembling an aluminum heat exchanger by brazing, said aluminum brazing material consisting essentially of 4.5 to 10% of Si, from 0.03% to 0.07% of Sr, and the balance essentially aluminum.

2. An aluminum brazing material used for assembling an aluminum heat exchanger by brazing, said aluminum brazing material consisting essentially of 4.5 to 10% of Si, from 0.03% to 0.07% of Sr, at least one element selected from the group consisting of 0.3 to 3.0% of Mg, 2.3 to 4.7% of Cu and 9.3 to 10.7% of Zn, and the balance essentially aluminum.

3. An aluminum brazing material used for assembling an aluminum heat exchanger by brazing, said aluminum brazing material consisting essentially of 4.5 to 10% of Si, from 0.03% to 0.07% of Sr, from 9.3 to 10.7% of Zn and the balance essentially aluminum.

4. A brazing method which comprises: brazing aluminum structural members using as a filler, an aluminum brazing material as claimed in claim 1.

* * * * *